United States Patent
Okaeme et al.

(10) Patent No.: US 9,954,358 B2
(45) Date of Patent: Apr. 24, 2018

(54) CONTROL CIRCUIT

(75) Inventors: Nnamdi Okaeme, London (GB); David Reginald Trainer, Alvaston (GB); Colin Charnock Davidson, Radford Rise (GB)

(73) Assignee: General Electric Technology GmbH, Baden (CH)

(*) Notice: Subject to any disclaimer, the term of this patent is extended or adjusted under 35 U.S.C. 154(b) by 528 days.

(21) Appl. No.: 14/378,319

(22) PCT Filed: Mar. 1, 2012

(86) PCT No.: PCT/EP2012/053571
§ 371 (c)(1),
(2), (4) Date: Sep. 9, 2014

(87) PCT Pub. No.: WO2013/127461
PCT Pub. Date: Sep. 6, 2013

(65) Prior Publication Data
US 2015/0009594 A1    Jan. 8, 2015

(51) Int. Cl.
*H02H 3/16*    (2006.01)
*H02J 1/02*    (2006.01)
(Continued)

(52) U.S. Cl.
CPC .................. *H02J 1/02* (2013.01); *H02H 3/16* (2013.01); *H02H 7/268* (2013.01); *H02J 3/36* (2013.01);
(Continued)

(58) Field of Classification Search
CPC .......... H02H 3/16; H02H 7/268; H02H 9/041; Y10T 307/445; H02J 1/02; H02J 3/36;
(Continued)

(56) References Cited

U.S. PATENT DOCUMENTS 3,857,083 A    12/1974    Lundstrom
3,867,643 A    2/1975    Baker et al.
(Continued)

FOREIGN PATENT DOCUMENTS

CN    1113095 A    12/1995
CN    101390267 A    3/2009
(Continued)

OTHER PUBLICATIONS

Office Action, dated Aug. 28, 2015, issued in U.S. Appl. No. 14/124,704.
(Continued)

*Primary Examiner* — Zeev V Kitov
(74) *Attorney, Agent, or Firm* — GE Global Patent Operation; Scott R. Stanley (57) ABSTRACT

The control circuit includes first and second primary terminals for connection to a DC network, a secondary terminal connected in series between the first and second primary terminals and at least one auxiliary energy conversion element and an auxiliary terminal. The first and second primary terminals have a plurality of modules and a plurality of primary energy conversion elements connected in series therebetween to define a current transmission path, each module including at least one energy storage device, each energy storage device being selectively removable from the current transmission path. The plurality of modules include a first module and a second module the first module being connected in series with at least one primary energy conversion element between the first primary terminal and the secondary terminal to define a first current transmission path portion, and the second module being connected in series with at least one other primary energy conversion element between the second primary terminal and the secondary terminal to define a second current transmission path por-
(Continued)

tion. The auxiliary energy conversion element is connected in series between the secondary and auxiliary terminals, the auxiliary terminal being for connection to ground.

12 Claims, 8 Drawing Sheets

(51) Int. Cl.
  H02H 7/26 (2006.01)
  H02J 3/36 (2006.01)
  H02J 4/00 (2006.01)
  H02H 9/04 (2006.01)
  H02M 7/483 (2007.01)
  H02M 1/32 (2007.01)
(52) U.S. Cl.
  CPC ............... *H02J 4/00* (2013.01); *H02H 9/041* (2013.01); *H02J 2003/365* (2013.01); *H02M 1/32* (2013.01); *H02M 2007/4835* (2013.01); *Y02E 60/60* (2013.01); *Y10T 307/445* (2015.04)
(58) Field of Classification Search
  CPC ....... H02J 4/00; H02J 2003/365; Y02E 60/60; H02M 1/32; H02M 2007/4835
  See application file for complete search history.

(56) References Cited

U.S. PATENT DOCUMENTS

| | | | |
|---|---|---|---|
| 4,051,545 A * | 9/1977 | Kloss | H02H 7/0833 361/111 |
| 4,053,820 A | 10/1977 | Peterson et al. | |
| 4,300,181 A | 11/1981 | Premerlani | |
| 4,456,940 A * | 6/1984 | Hammerberg | H02H 9/041 361/119 |
| 4,636,907 A | 1/1987 | Howell | |
| 4,658,227 A | 4/1987 | Howell et al. | |
| 4,663,702 A | 5/1987 | Tanaka | |
| 4,816,736 A | 3/1989 | Dougherty et al. | |
| 5,027,264 A | 6/1991 | Dedoncker et al. | |
| 5,093,583 A | 3/1992 | Mashino et al. | |
| 5,164,872 A | 11/1992 | Howell | |
| 5,339,210 A | 8/1994 | Howell | |
| 5,345,375 A | 9/1994 | Mohan | |
| 5,414,612 A | 5/1995 | Bjoerklund et al. | |
| 5,499,178 A | 3/1996 | Mohan | |
| 5,515,264 A | 5/1996 | Stacey | |
| 5,532,575 A | 7/1996 | Ainsworth et al. | |
| 5,561,595 A | 10/1996 | Smith | |
| 5,644,482 A | 7/1997 | Asplund | |
| 5,673,189 A | 9/1997 | Schettler | |
| 5,719,486 A | 2/1998 | Taniguchi et al. | |
| 5,726,557 A | 3/1998 | Umeda et al. | |
| 5,870,293 A * | 2/1999 | Svensson | H02J 3/36 363/35 |
| 5,889,667 A | 3/1999 | Bernet | |
| 5,892,677 A | 4/1999 | Chang | |
| 5,936,855 A | 8/1999 | Salmon | |
| 5,986,909 A | 11/1999 | Hammond et al. | |
| 5,999,422 A | 12/1999 | Goransson et al. | |
| 6,134,126 A | 10/2000 | Ikekame et al. | |
| 6,137,704 A | 10/2000 | Ito et al. | |
| 6,236,580 B1 | 5/2001 | Aiello et al. | |
| 6,301,130 B1 | 10/2001 | Aiello et al. | |
| 6,320,767 B1 | 11/2001 | Shimoura et al. | |
| 6,392,348 B1 | 5/2002 | Dougherty | |
| 6,442,051 B1 | 8/2002 | Ryan et al. | |
| 6,603,675 B1 | 8/2003 | Norrga | |
| 6,879,062 B2 | 4/2005 | Oates | |
| 6,987,680 B2 | 1/2006 | Vire et al. | |
| 7,050,311 B2 | 5/2006 | Lai et al. | |
| 7,170,767 B2 | 1/2007 | Bixel | |
| 7,199,535 B2 | 4/2007 | Welchko et al. | |
| 7,274,576 B1 | 9/2007 | Zargari et al. | |
| 7,292,462 B2 | 11/2007 | Watanabe et al. | |
| 7,298,115 B2 | 11/2007 | Nishimura et al. | |
| 7,499,291 B2 | 3/2009 | Han | |
| 7,622,825 B2 | 11/2009 | Brune et al. | |
| 7,729,144 B2 | 6/2010 | Urakabe et al. | |
| 7,839,125 B2 | 11/2010 | Berggren et al. | |
| 8,188,720 B2 | 5/2012 | Kim et al. | |
| 8,223,517 B2 | 7/2012 | Kishida et al. | |
| 8,294,408 B2 | 10/2012 | Matt et al. | |
| 8,390,259 B2 | 3/2013 | Dommaschk et al. | |
| 8,576,593 B2 | 11/2013 | Mori et al. | |
| 8,599,591 B2 | 12/2013 | Crookes et al. | |
| 8,837,176 B2 | 9/2014 | Trainer et al. | |
| 8,848,401 B2 | 9/2014 | Green et al. | |
| 8,854,843 B2 | 10/2014 | Trainer et al. | |
| 8,861,231 B2 | 10/2014 | Cross et al. | |
| 8,861,234 B2 | 10/2014 | Trainer et al. | |
| 8,867,242 B2 | 10/2014 | Clare et al. | |
| 8,867,244 B2 | 10/2014 | Trainer et al. | |
| 8,879,291 B2 | 11/2014 | Trainer et al. | |
| 8,891,209 B2 | 11/2014 | Hafner et al. | |
| 8,934,268 B2 | 1/2015 | Trainer et al. | |
| 9,065,299 B2 | 6/2015 | Trainer et al. | |
| 9,130,458 B2 | 9/2015 | Crookes et al. | |
| 2002/0060497 A1 | 5/2002 | Arita et al. | |
| 2002/0149953 A1 | 10/2002 | Smedley et al. | |
| 2002/0176265 A1 | 11/2002 | Oates | |
| 2003/0202367 A1 | 10/2003 | Schreiber | |
| 2004/0218318 A1 | 11/2004 | Bijlenga et al. | |
| 2005/0127853 A1 | 6/2005 | Su | |
| 2005/0135126 A1 | 6/2005 | Gazel et al. | |
| 2005/0146226 A1 | 7/2005 | Trainer et al. | |
| 2008/0002443 A1 | 1/2008 | Ueda et al. | |
| 2008/0007978 A1 | 1/2008 | Han | |
| 2008/0137383 A1 | 6/2008 | Chang et al. | |
| 2008/0179951 A1 | 7/2008 | Brune et al. | |
| 2008/0197966 A1 | 8/2008 | Sommer | |
| 2008/0205093 A1 | 8/2008 | Davies et al. | |
| 2008/0258661 A1 | 10/2008 | Nagashima et al. | |
| 2008/0310205 A1 | 12/2008 | Hiller | |
| 2009/0021966 A1 | 1/2009 | Jacobson et al. | |
| 2009/0027934 A1 | 1/2009 | Bustos | |
| 2009/0033254 A1 | 2/2009 | Nagashima et al. | |
| 2009/0085548 A1 | 4/2009 | Suh et al. | |
| 2009/0102436 A1 | 4/2009 | Valderrama et al. | |
| 2009/0206781 A1 | 8/2009 | Itoh et al. | |
| 2010/0067266 A1 | 3/2010 | Dommaschk et al. | |
| 2010/0118578 A1 | 5/2010 | Dommaschk et al. | |
| 2010/0309698 A1 | 12/2010 | Asplund et al. | |
| 2011/0018481 A1 | 1/2011 | Hiller | |
| 2011/0044077 A1 | 2/2011 | Nielsen | |
| 2011/0149622 A1 | 6/2011 | Lin | |
| 2011/0205768 A1 | 8/2011 | Svensson | |
| 2011/0260701 A1 | 10/2011 | Horger et al. | |
| 2012/0026767 A1 | 2/2012 | Inoue et al. | |
| 2012/0063185 A1 | 3/2012 | Janning | |
| 2012/0069610 A1 | 3/2012 | Trainer et al. | |
| 2012/0120697 A1 | 5/2012 | Cuk | |
| 2012/0127766 A1 | 5/2012 | Crookes et al. | |
| 2012/0170338 A1 | 7/2012 | Trainer et al. | |
| 2012/0182771 A1 | 7/2012 | Trainer et al. | |
| 2012/0188803 A1 | 7/2012 | Trainer et al. | |
| 2012/0195084 A1 | 8/2012 | Norrga | |
| 2012/0200165 A1 | 8/2012 | Kansala | |
| 2012/0234796 A1 | 9/2012 | Juhlin | |
| 2013/0020881 A1 | 1/2013 | Panousis et al. | |
| 2013/0026841 A1 | 1/2013 | Hosini et al. | |
| 2013/0051105 A1 | 2/2013 | Wang et al. | |
| 2013/0094264 A1 | 4/2013 | Crookes et al. | |
| 2013/0099572 A1 | 4/2013 | Norrga | |
| 2013/0119970 A1 | 5/2013 | Trainer et al. | |
| 2013/0128629 A1 | 5/2013 | Clare et al. | |
| 2013/0128636 A1 | 5/2013 | Trainer et al. | |
| 2013/0181532 A1* | 7/2013 | Kj R | H02M 1/34 307/82 |

(56) References Cited

U.S. PATENT DOCUMENTS

| | | |
|---|---|---|
| 2013/0182467 A1 | 7/2013 | Cross et al. |
| 2013/0194838 A1 | 8/2013 | Jang et al. |
| 2013/0208514 A1 | 8/2013 | Trainer et al. |
| 2013/0208521 A1 | 8/2013 | Trainer et al. |
| 2013/0279211 A1 | 10/2013 | Green et al. |
| 2014/0098575 A1 | 4/2014 | Whitehouse |
| 2014/0133196 A1 | 5/2014 | Trainer |
| 2014/0146583 A1 | 5/2014 | Trainer et al. |
| 2014/0254205 A1 | 9/2014 | Trainer et al. |
| 2014/0293656 A1 | 10/2014 | Trainer et al. |
| 2014/0293668 A1 | 10/2014 | Trainer et al. |
| 2014/0313797 A1 | 10/2014 | Davidson et al. |
| 2015/0003134 A1 | 1/2015 | Trainer |
| 2015/0009594 A1 | 1/2015 | Okaeme et al. |
| 2015/0116881 A1 | 4/2015 | Burnett et al. |
| 2015/0131189 A1 | 5/2015 | Davidson et al. |
| 2015/0214834 A1 | 7/2015 | Trainer |

FOREIGN PATENT DOCUMENTS

| | | |
|---|---|---|
| CN | 101 795 072 A | 8/2010 |
| CN | 201742086 | 2/2011 |
| DE | 43 17 965 | 12/1994 |
| DE | 195 35 552 | 4/1996 |
| DE | 101 03 031 | 7/2002 |
| DE | 10 2005 040 432 | 3/2007 |
| DE | 10 2007 003172 | 2/2008 |
| DE | 10 2008 045247 | 3/2008 |
| DE | 10 2008 014 898 | 9/2009 |
| DE | 10 2010 007 452 | 8/2011 |
| EP | 0868001 A2 | 9/1998 |
| EP | 0 867 998 B1 | 3/2007 |
| EP | 1 800 391 A2 | 6/2007 |
| GB | 2 294 821 A | 5/1996 |
| GB | 2 375 902 A | 11/2002 |
| GB | 2 418 079 A | 3/2006 |
| JP | 2008-125310 A | 5/2008 |
| WO | WO 97/02639 | 1/1997 |
| WO | WO 02/50972 | 6/2002 |
| WO | WO 02/063758 | 8/2002 |
| WO | WO 03/055048 | 7/2003 |
| WO | WO 2007/023061 A2 | 3/2007 |
| WO | WO 2007/028349 | 3/2007 |
| WO | WO 2007/028350 | 3/2007 |
| WO | WO 2007/033852 | 3/2007 |
| WO | WO 2008/024038 | 2/2008 |
| WO | 2008086760 A1 | 7/2008 |
| WO | WO 2008/086760 | 7/2008 |
| WO | WO 2009/149743 | 12/2009 |
| WO | 2010015432 A1 | 2/2010 |
| WO | WO 2010/025758 | 3/2010 |
| WO | WO 2010/040388 | 4/2010 |
| WO | WO 2010/069371 | 6/2010 |
| WO | WO 2010/088969 | 8/2010 |
| WO | WO 2010/112523 | 10/2010 |
| WO | WO 2010/145688 | 12/2010 |
| WO | WO 2010/145689 | 12/2010 |
| WO | WO 2010/145690 | 12/2010 |
| WO | WO 2010/149200 | 12/2010 |
| WO | WO 2011/012171 | 2/2011 |
| WO | WO 2011/012174 | 2/2011 |
| WO | WO 2011/015227 | 2/2011 |
| WO | 2011/029480 A1 | 3/2011 |
| WO | WO 2011/044928 | 4/2011 |
| WO | 2011/050832 A1 | 5/2011 |
| WO | WO 2011/050847 | 5/2011 |
| WO | WO 2011/098117 | 8/2011 |
| WO | 2011116816 A1 | 9/2011 |
| WO | WO 2011/113471 | 9/2011 |
| WO | WO 2011/124258 | 10/2011 |
| WO | WO 2011/127980 | 10/2011 |
| WO | WO 2011/141054 | 11/2011 |
| WO | WO 2011/157300 | 12/2011 |
| WO | 2012007040 A1 | 1/2012 |
| WO | WO 2012/013248 | 2/2012 |
| WO | WO 2012/025142 | 3/2012 |
| WO | WO 2012/167826 | 12/2012 |
| WO | WO 2013/000510 | 1/2013 |
| WO | 2013068031 A1 | 5/2013 |
| WO | WO 2013/071975 | 5/2013 |
| WO | WO 2013/017160 | 7/2013 |
| WO | WO 2013/017177 | 7/2013 |
| WO | 2013120528 A1 | 8/2013 |
| WO | WO 2013/127461 | 9/2013 |
| WO | WO 2013/127462 | 9/2013 |
| WO | WO 2013/127463 | 9/2013 |

OTHER PUBLICATIONS

Office Action, dated Sep. 1, 2015, issued in U.S. Appl. No. 14/377,824.
Office Action, dated Sep. 18, 2015, issued in U.S. Appl. No. 14/129,923.
Office Action, dated Oct. 7, 2015, issued in U.S. Appl. No. 13/388,277.
Office Action, dated Dec. 7, 2015, issued in U.S. Appl. No. 14/236,627.
Examiner-Initiated Interview Summary, dated Jan. 5, 2016, issued in U.S. Appl. No. 14/359,088.
Office Action, dated Mar. 16, 2016, issued in U.S. Appl. No. 14/381,570.
Office Action, dated Mar. 23, 2016, issued in U.S. Appl. No. 14/379,746.
Office Action in U.S. Appl. No. 13/388,277, dated Mar. 18, 2015.
Notice of Allowance in U.S. Appl. No. 13/634,205, dated Apr. 27, 2015.
Office Action in U.S. Appl. No. 14/129,923, dated Feb. 17, 2015.
Office Action in U.S. Appl. No. 14/359,088, dated Apr. 7, 2015.
Allebrod, S. et al., "New Transformerless, Scalable Modular Multilevel Converters for HVDC—Transmission", Power Electronics Specialists Conference, IEEE, Jun. 15, 2008, pp. 174-179.
Baran, M. E. et al., "Overcurrent Protection in DC Zonal Shipboard Power Systems using Solid State Protection Devices", Electric Ship Technologies Symposium, 2007, ESTS '07, IEEE, IEEE, PI, May 1, 2007, pp. 221-224.
Davidson, C.C et al., "Innovative Concepts for Hybrid Multi-Level Converters for HVDC Power Transmission", 9th IET International Conference on AC and DC Power Transmission, ACDC 2010, Oct. 19-21, 2010, 5 pp.
Ertl, H et al., "A Constant Output Current Three-Phase Diode Bridge Rectifier Employing a Novel Electronic Smoothing Inductor", IEEE Transactions on Industrial Electronics,vol. 52, Issue 2, Apr. 1, 2005, pp. 454-461.
Flourentzou, Nikolas et al., "VSC-Based HVDC Power Transmission Systems: An Overview", IEEE Transactions on Power Electronics, vol. 24, No. 3, Mar. 2009, pp. 592602.
Glinka, M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.
Guanjun Ding, et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, pp. 1-8.
Hagiwara, Makoto et al., "PWM Control and Experiment of Modular Multilevel Converters", Power Electronics Specialists Conference (PESC), Rhodes, Jun. 15-19, 2008, IEEE, pp. 154-161.
Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.
Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.

(56) References Cited

OTHER PUBLICATIONS

Lesnicar, A. et al., "A New Modular Voltage Source Inverter Topology", European Power Electronics Conference (EPE), Toulouse France, Sep. 2-4, 2003, 10 pages.
Lesnicar, A. et al., "An Innovative Modular Multilevel Converter Topology Suitable for a Wide Power Range", Power Tech Conference Proceedings, Bologna, Italy, Jun. 23-26, 2003, Bologna, IEEE, vol. 3, 2003, 6 pages.
Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.
Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.
Merlin, M.M.C. et al. "A New Hybrid Multi-Level Voltage-Source Converter With DC Fault Blocking Capability", 9th IET International Conference on AC and DC Power Transmission, ACDC 2010, Oct. 19-21, 2010, 5 pages.
Qahraman, B. et al., "A VSC Based Series Hybrid Converter for HVDC Transmission", Canadian Conference Electrical and Computer Engineering Conference, 2005, CCECE/CCGEI, Saskatoon, May 1-4, 2005, pp. 458-461.
Raju, N.R., "A DC Link-Modulated Three-Phase Converter", Industry Applications Conference, 2001. Thirty-Sixth IAS Annual Meeting, Chicago, IL, Sep. 30, 2001-Oct. 4, 2001. Conference Record of the 2001 IEEE, vol. 4, pp. 2181-2185.
Su, Gui-Jia et al., "Multilevel DC Link Inverter for Brushless Permanent Magnet Motors with Very Low Inductance", Industry Applications Conference, 2001. Thirty-Sixth IAS Annual Meeting, Chicago, IL, Sep. 30, 2001-Oct. 4, 2001. Conference Record of the 2001 IEEE, vol. 2, pp. 829-834.
Watkins, S.J. et al., "Multilevel Asymmetric Power Converters for Switched Reluctance Machines", International Conference on Power Electronics, Machines and Drives, Apr. 16-18, 2002, IEEE 2002, Conf. Publ. No. 487, pp. 195-200.
Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.
Zhang, W. et al., "Active DC Filter for HVDC Systems", IEEE Computer Applications in Power, vol. 7, No. 1, Jan. 1994, New York, USA, pp. 40-44.
PCT International Search Report and Written Opinion for Application No. PCT/EP2009/057388, dated Mar. 18, 2010.
PCT International Preliminary Report on Patentability in International Application No. PCT/EP2009/057388, dated Dec. 14, 2011.
PCT International Search Report and Written Opinion in International Application No. PCT/EP2009/057736, dated Mar. 26, 2010.
PCT International Preliminary Report on Patentability in International Application No. PCT/EP2009/057736, dated Nov. 24, 2011.
PCT International Search Report and Written Opinion in International Application No. PCT/EP2009/059973, dated Aug. 13, 2010.
PCT International Preliminary Report on Patentability in International Application No. PCT/EP2009/059973, dated Oct. 5, 2011.
PCT International Search Report and Written Opinion in International Application No. PCT/EP2010/051572, dated Jan. 19, 2011.
PCT International Preliminary Report on Patentability in International Application No. PCT/EP2010/051572, dated Apr. 20, 2012.
PCT International Search Report and Written Opinion in International Application No. PCT/EP2010/053290, dated Feb. 11, 2011.
PCT International Preliminary Report on Patentability in International Application No. PCT/EP2010/053290, dated Apr. 20, 2012.
PCT International Search Report and Written Opinion in International Application No. PCT/EP2010/054660, dated Feb. 24, 2011.
PCT International Preliminary Report on Patentability in International Application No. PCT/EP2010/054660, dated Jun. 6, 2012.
PCT International Search Report for International Application No. PCT/EP2010/054974, dated Mar. 4, 2011.
PCT International Preliminary Report on Patentability in International Application No. PCT/EP2010/054974, dated Aug. 10, 2012.
PCT International Search Report and Written Opinion in International Application No. PCT/EP2010/058630, dated Apr. 19, 2011.
PCT International Preliminary Report on Patentability in International Application No. PCT/EP2010/058630, dated Dec. 19, 2012.
PCT International Search Report in International Application No. PCT/EP2010/061145, dated Jun. 5, 2011.
PCT International Preliminary Report on Patentability in International Application No. PCT/EP2010/061145, dated Aug. 20, 2012.
PCT International Search Report and Written Opinion in International Application No. PCT/EP10/62316, dated Jul. 6, 2011.
PCT International Preliminary Report on Patentability in International Application No. PCT/EP10/62316, dated Mar. 7, 2013.
PCT International Search Report and Written Opinion in International Application No. PCT/EP2011/059514, dated Jul. 5, 2012.
PCT International Preliminary Report on Patentability in International Application No. PCT/EP2011/059514, dated Aug. 1, 2013.
PCT International Search Report and Written Opinion in International Application No. PCT/EP2011/060907, dated Jul. 16, 2012.
PCT International Preliminary Report on Patentability in International Application No. PCT/EP2011/060907, dated Sep. 24, 2013.
PCT International Search Report and Written Opinion in International Application No. PCT/EP2011/063207, dated May 30, 2012.
PCT International Preliminary Report on Patentability in International Application No. PCT/EP2011/063207, dated Apr. 2, 2014.
PCT International Search Report and Written Opinion in International Application No. PCT/EP2011/064545, dated Jun. 11, 2012.
PCT International Preliminary Report on Patentability in International Application No. PCT/EP2011/064545, dated May 19, 2014.
PCT International Search Report and Written Opinion in International Application No. PCT/EP2011/070402, dated Sep. 27, 2012.
PCT International Preliminary Report on Patentability in International Application No. PCT/EP2011/070402, dated Feb. 18, 2014.
PCT International Preliminary Report on Patentability in International Application No. PCT/EP2012/053571, dated Sep. 12, 2014.
PCT International Search Report and Written Opinion in International Application No. PCT/EP2012/053574, dated Nov. 20, 2012.
PCT International Preliminary Report on Patentability in International Application No. PCT/EP2012/053574, dated Jul. 21, 2014.
PCT International Search Report and Written Opinion in International Application No. PCT/EP2012/053573, dated Dec. 4, 2012.
PCT International Preliminary Report on Patentability in International Application No. PCT/EP2012/053573, dated Jul. 21, 2014.
First Chinese Office Action in Application No. 200980160700.4, dated Jun. 25, 2014.
Notice of Allowance in U.S. Appl. No. 13/378,336, dated Feb. 6, 2014.
Notice of Allowance in U.S. Appl. No. 13/378,336, dated Jun. 13, 2014.
Notice of Allowance in U.S. Appl. No. 13/380,500, dated Jun. 11, 2013.
Notice of Allowance in U.S. Appl. No. 13/380,500, dated Jul. 31, 2013.
Office Action in U.S. Appl. No. 13/388,277, dated Nov. 22, 2013.
Office Action in U.S. Appl. No. 13/388,277, dated Jul. 3, 2014.
Notice of Allowance in U.S. Appl. No. 13/576,920, dated Dec. 4, 2013.
Notice of Allowance in U.S. Appl. No. 13/576,920, dated Mar. 20, 2014.
Notice of Allowance in U.S. Appl. No. 13/576,920, dated Jun. 9, 2014.
Office Action in U.S. Appl. No. 13/634,205, dated Sep. 22, 2014.
Office Action in U.S. Appl. No. 13/639,844, dated May 22, 2014.
Notice of Allowance in U.S. Appl. No. 13/639,844, dated Sep. 8, 2014.
Notice of Allowance in U.S. Appl. No. 13/640,468, dated Jun. 4, 2014.
Notice of Allowance in U.S. Appl. No. 13/805,333, dated Feb. 2, 2015.
Notice of Allowance in U.S. Appl. No. 13/813,414, dated Jun. 2, 2014.

(56) References Cited

OTHER PUBLICATIONS

Notice of Allowance in U.S. Appl. No. 13/818,654, dated May 30, 2014.
U.S. Appl. No. 14/379,746, filed Aug. 28, 2014.
U.S. Appl. No. 14/381,570, filed Aug. 27, 2014.
U.S. Appl. No. 14/357,908, filed May 13, 2014.
International Search Report in PCT/EP2012/053571, European Patent Office, Rijswijk, NL, dated Jun. 20, 2012.
Alstom Grid, 7/21/2015HVDC-VSC: transmission technology of the future:, 2011, Retrieved from the Internet: URL: http://www.tresamigaslic.com/docs/ThinkGrid08-06-Chapter1-Art1%20VSC_EV.pdf. [retrieved on Oct. 2010], pp. 13-17.
Cheng et al., "A Comparison of Diode-Clamped and Cascaded Multilevel Converters for a STATCOM With Energy Storage", IEEE Transactions on Industrial Electronics, vol. 53, No. 5, Oct. 1, 2006, pp. 1512-1521.
Hagiwara, M. et al., "Control and Experiment of Pulsewidth-Modulated Modular Multilevel Converters", IEEE Transactions on Power Electronics, IEEE Service Center, Piscataway, NJ, vol. 24, Issue 7, Jul. 1, 2009, pp. 1737-1746.
PCT International Search Report and Written Opinion in International Application No. PCT/EP2011/069563 dated Aug. 7, 2012.
PCT International Preliminary Rport on Patentability in International Application No. PCT/EP2011/069563 dated Dec. 13, 2013.
PCT International Search Report and Written Opinion in Application No. PCT/EP2012/052692, dated Mar. 1, 2013.
PCT International Preliminary Report on Patentability and Written Opinion in Application No. PCT/EP2012/052692, dated Sep. 10, 2014.
Notice of Allowance in U.S. Appl. No. 14/356,882, dated Jul. 20, 2015.
Office Action in U.S. Appl. No. 14/236,627, dated Aug. 4, 2015.
Office Action in U.S. Appl. No. 14/236,628, dated Jul. 31, 2015.
Supplemental Notice of Allowability in U.S. Appl. No. 13,634,205, dated Aug. 7, 2015.
Chinese Office Action issued in connection with corresponding CN Application No. 201280071028.3 dated Jun. 1, 2016.

\* cited by examiner

CONTROL CIRCUIT

CROSS-REFERENCE TO RELATED PATENT APPLICATION

The present application is a National Stage Application of International Application No. PCT/EP2012/053571 entitled "CONTROL CIRCUIT" filed Mar. 1, 2012, the contents of which are incorporated herein by reference in its entirety.

SUMMARY

This invention relates to a control circuit.

Figure 1A:
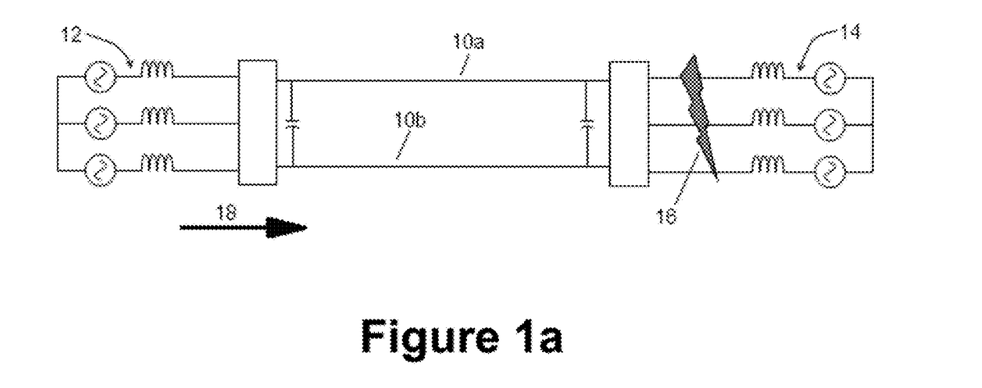
FIGS. 1a and 1b show, in schematic form, prior art DC transmission schemes.

In DC power transmission schemes, DC transmission lines 10a,10b are used to interconnect a transmitting electrical network 12 and a receiving electrical network 14 to permit transfer of power between the two electrical networks 12,14, as shown in FIG. 1a. In the event of a fault 16 preventing the receiving electrical network 14 from receiving power from the DC transmission lines 10a,10b, the transmitting electrical network 12 cannot interrupt the transmission of power into the DC transmission lines 10a,10b. This is because generators, such as wind turbines, cannot be switched off instantaneously and so will continue to feed energy 18 into the DC transmission lines 10a,10b. Moreover, the receiving electrical network 14 is required by a Grid Code to ride through a supply dip, e.g. where the voltage is reduced to approximately 15% of its original value, and to resume the transmission of power upon the removal of the fault 16.

Continuing to transmit power into the DC transmission lines 10a,10b results in an accumulation of excess power in the DC transmission lines 10a,10b which not only adversely affects the balance between the transmission and receipt of power by the respective electrical networks 12,14, but also might damage various components of the DC power transmission scheme, particularly as a result of high voltage stress caused by uncontrolled charging of the capacitance of the DC transmission lines 10a,10b.

One solution for preventing the accumulation of excess power is to temporarily store the excess power in DC link capacitors and other capacitors forming part of the transmitting electrical network 12. The finite energy storage capability of the transmitting electrical network 12 however limits the amount of real power that may be temporarily stored away until the receiving electrical network 14 returns to its working state.

Figure 1B:
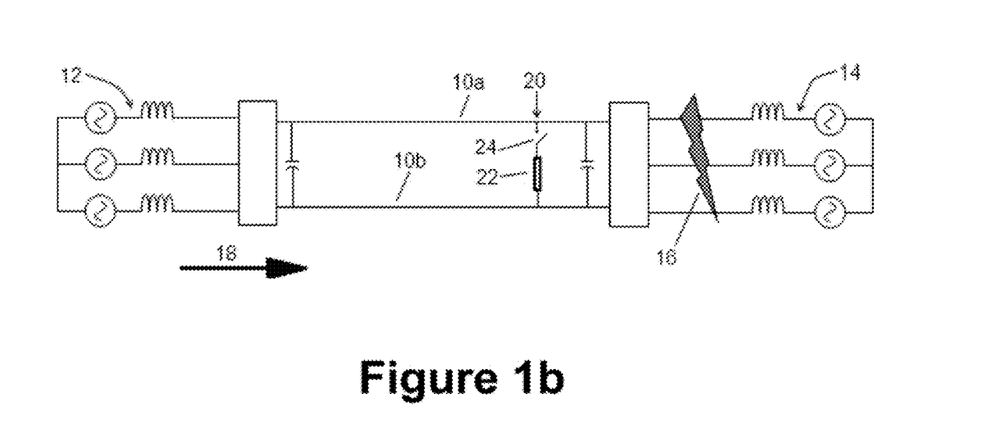

Another solution for preventing the accumulation of excess power is the use of a load dump chopper circuit 20 to divert the excess power away from the DC transmission lines 10a,10b. FIG. 1b shows a dump resistor 22 connected in series with a switch 24 across the DC transmission lines 10a, 10b. Closing the switch 24 causes current to flow from the DC transmission lines through the dump resistor 22, which in turn causes power to dissipate via the dump resistor 22. This allows excess energy to be removed from the DC transmission lines 10a, 10b via the load dump chopper circuit 20.

Existing chopper circuits utilise a simple semiconductor switch to connect a resistor between the DC transmission lines in order to absorb excess energy. This type of chopper relies on the series connection and simultaneous switching of a large number of lower voltage semiconductor switches which are operated in a pulse width modulation (PWM) manner to accurately control the energy absorption. The design and operation of such a chopper circuit switch requires large passive devices and complex control methods to ensure equal sharing of the total applied voltage between the individual semiconductor switches. In addition, the PWM action leads to very high rates of change of voltage and current within the chopper circuit and DC transmission lines which leads to undesirable electrical spikes and a high level of electromagnetic noise and interference.

According to an aspect of the invention, there is provided a control circuit comprising first and second primary terminals for connection to a DC network, the first and second primary terminals having a plurality of modules and a plurality of primary energy conversion elements connected in series therebetween to define a current transmission path, each module including at least one energy storage device, the or each energy storage device being selectively removable from the current transmission path;

the control circuit further including a secondary terminal connected in series between the first and second primary terminals, the plurality of modules including at least one first module and at least one second module, the or each first module being connected in series with at least one primary energy conversion element between the first primary terminal and the secondary terminal to define a first current transmission path portion, the or each second module being connected in series with at least one other primary energy conversion element between the second primary terminal and the secondary terminal to define a second current transmission path portion;

the control circuit further including at least one auxiliary energy conversion element and an auxiliary terminal, the or each auxiliary energy conversion element being connected in series between the secondary and auxiliary terminals, the auxiliary terminal being for connection to ground.

The ability to selectively remove the or each energy storage device of each module from the current transmission path has been found to allow the immediate transfer of energy, i.e. excess power, from the DC network to the control circuit and thereby enables rapid regulation of the energy levels in the DC network. Such a DC network may include, but is not limited to, DC transmission lines of a DC power transmission scheme.

To regulate the energy levels in the DC network, the control circuit in its normal operation may be configured to adopt a standby configuration in which the energy storage devices are inserted into the current transmission path to block current from flowing in the current transmission path during normal conditions of the DC network, or to selectively remove one or more energy storage devices from the current transmission path to cause a current waveform to flow from the DC network through the current transmission path so as to enable excess energy to be removed from the DC network and dissipated via the primary resistors.

During normal operation of the control circuit, the maximum voltage across each of the first and second current transmission path portions is equal to half of the DC network voltage Vdc, i.e. 0.5 Vdc, while the maximum current flowing through each of the first and second current transmission path portions is equal to half of the DC network voltage Vdc divided by the impedance of the or each corresponding primary energy conversion element when the or each energy storage device is removed from the respective current transmission path portion. Each module and primary energy conversion element is therefore rated to be compatible with the maximum voltage and current levels arising during normal operation of the control circuit.

A DC pole-to-ground fault may however occur between one of the poles of the DC network and ground. This results in a short-circuit between the affected DC network pole and ground that bypasses the corresponding current transmission path portion. During the DC pole-to-ground fault, fault operation of the control circuit is required to protect the components of the control circuit from overvoltage or overcurrent situations.

During fault operation of the control circuit, current flows between the non-affected DC network pole and ground. The or each energy storage device is removed from the non-bypassed current transmission path portion to allow the current to bypass the or each energy storage device so as to reduce the risk of damage to the or each module. Thus, the entire DC network voltage Vdc is imposed across the or each auxiliary energy conversion element and the or each primary energy conversion element of the non-bypassed current transmission path portion. This configuration of the control circuit, in response to the DC pole-to-ground fault, not only limits the voltage appearing across the components of the non-bypassed current transmission path portion, but also limits the current flowing through the non-bypassed current transmission path portion. As such, the inclusion of the or each auxiliary energy conversion element allows the control circuit to be configured to control the maximum voltage and current levels arising during the DC pole-to-ground fault. This in turn reduces the risk of damage to its components that is caused by overcurrent or overvoltage during the DC pole-to-ground fault.

Omitting the or each auxiliary energy conversion element from the control circuit would otherwise result in the entire DC network voltage Vdc being imposed only across the or each primary energy conversion element of the non-bypassed current transmission path portion during the DC pole-to-ground fault. This results in an increase in current flowing through the non-bypassed current transmission path portion over the maximum current level arising during normal operation of the control circuit.

In addition, in the absence of the or each auxiliary energy conversion element, the or each energy storage device of the non-bypassed current transmission path portion may be inserted into the current transmission path to provide a voltage to oppose the DC network voltage Vdc and protect the or each module from overvoltage. This however only temporarily limits the voltage across the or each primary energy conversion element of the non-bypassed current transmission path portion. This is because insertion of the or each energy storage device into the current transmission path charges the or each energy storage device so that the voltage across the non-bypassed current transmission path portion approaches the value of the DC network voltage Vdc. This may damage the or each energy storage device once the limits of its finite storage capability is reached.

The identified problems caused by omission of the or each auxiliary energy conversion element from the control circuit may be resolved by increasing the voltage and current ratings of the components of the control circuit to be compatible with the increased voltage and current levels arising during the DC pole-to-ground fault. Doing so would prevent damage to the components of the control circuit due to overvoltage or overcurrent during the DC pole-to-ground fault, but would however increase the overall size and cost of the control circuit.

On the other hand, the inclusion of the or each auxiliary energy conversion element in the control circuit allows the voltage and current ratings of the or each auxiliary energy conversion element to be configured in order to control the maximum voltage and current levels seen by the components of the control circuit to be the same during normal and fault operation of the control circuit. This therefore obviates the need to increase the voltage and current ratings of the components of the control circuit, and thereby minimises the overall size and cost of the control circuit.

Whilst it is possible to omit the connection to ground from the control circuit to avoid having to increase the voltage and current ratings of the components of the control circuit, doing so would remove the ability of the control circuit to discharge excess energy from the DC network after the DC pole-to-ground fault is cleared. Consequently discharging the excess energy from the DC network would require the use of additional equipment, which adds to the size, cost and complexity of the control circuit.

The inclusion of the at least one auxiliary energy conversion element in the control circuit therefore results in a control circuit that is not only capable of regulating energy levels in a DC network, but is also capable of protecting the components of the control circuit in a cost-efficient manner.

In embodiments of the invention, each module may further include at least one switching element to selectively direct current through the or each energy storage device and cause current to bypass the or each energy storage device.

In such embodiments, each module may include two pairs of switching elements connected in parallel with the or each energy storage device in a full-bridge arrangement to define a 4-quadrant bipolar module that can provide zero, positive or negative voltage and can conduct current in two directions.

In other such embodiments, each module may include first and second sets of series-connected current flow control elements, each set of current flow control elements including a switching element to selectively direct current through the or each energy storage device and a passive current check element to limit current flow through the module to a single direction, the first and second sets of series-connected current flow control elements and the or each energy storage device being arranged in a full-bridge arrangement to define a 2-quadrant bipolar rationalised module that can provide zero, positive or negative voltage while conducting current in a single direction.

Such modules provide a reliable means of selectively removing the or each energy storage device from the current transmission path.

Preferably the control circuit further includes a first controller to selectively remove each energy storage device from the current transmission path, the first controller being configured to switch each energy storage device in a fault protection mode and in a network discharging mode.

The first controller when operating in the fault protection mode may selectively remove the or each energy storage device of one of the first and second current transmission path portions from the current transmission path during a fault, in use, between the auxiliary terminal and the primary terminal connected to the other of the first and second current transmission path portions.

The first controller when operating in the fault protection mode may selectively remove the or each energy storage device of one of the first and second current transmission path portions from the current transmission path during a fault, in use, between the auxiliary terminal and the primary terminal connected to the one of the first and second current transmission path portions.

Selective removal of the or each energy storage device from the current transmission path during the DC pole-to-ground fault protects the or each module from overvoltage. This is because the or each removed energy storage device cannot be charged or discharged and therefore remains at a safe voltage level, and the DC network voltage is imposed across the or each auxiliary energy conversion element and the or each primary energy conversion element of the non-bypassed current transmission path portion.

The first controller when operating in the network discharging mode may selectively remove one or more energy storage devices of one of the first and second current transmission path portions from the current transmission path to cause a current waveform to flow from the DC network through the one of the first and second current transmission path portions.

During the DC pole-to-ground fault, the DC network pole that is not short-circuited to ground may be overcharged beyond its normal voltage level as a consequence of the DC network pole being exposed to the DC network voltage Vdc.

In the network discharging mode, the flow of current from the overcharged DC network pole to ground via the corresponding current transmission path portion enables excess energy to be transferred from the overcharged DC network pole to ground via the current transmission path portion and dissipated via the or each corresponding primary energy conversion element and the or each auxiliary energy conversion element. This in turns enables the DC network to be returned to its normal operating conditions.

In order to control the rate of discharge of excess energy from the DC network, the one or more energy storage devices of the one of the first and second current transmission path portions may be selectively removed from the current transmission path to vary the voltage across the one of the first and second current transmission path portions.

In further embodiments of the invention, each module may further include at least one switching element to selectively block current from flowing through the module.

Preferably the control circuit may further include a second controller to selectively switch each module to block current from flowing through the module, the second controller being configured to switch each module in a fault protection mode and in a network discharging mode.

The first and second controllers may either be formed as separate units or integrated to form a single control unit.

The second controller when operating in the fault protection mode may selectively switch the or each module of one of the first and second current transmission path portions to block current from flowing therethrough during a fault, in use, between the auxiliary terminal and the primary terminal connected to the one of the first and second current transmission path portions.

Instead of removing the or each energy storage device from the current transmission path, the or each module may be protected from overvoltage by blocking current from flowing through the or each module of the bypassed current transmission path portion during the DC pole-to-ground fault.

When a current waveform flows from the DC network through the one of the first and second current transmission path portions to discharge the DC network in the network discharging mode, the second controller may selectively switch the or each module of the other of the first and second current transmission path portions to block current from flowing therethrough.

This ensures that energy is only drawn from the DC network pole that was overcharged beyond its normal voltage level during the DC pole-to ground fault.

DRAWINGS

Preferred embodiments of the invention will now be described, by way of non-limiting examples, with reference to the accompanying drawings in which.

DESCRIPTION

Figure 2:
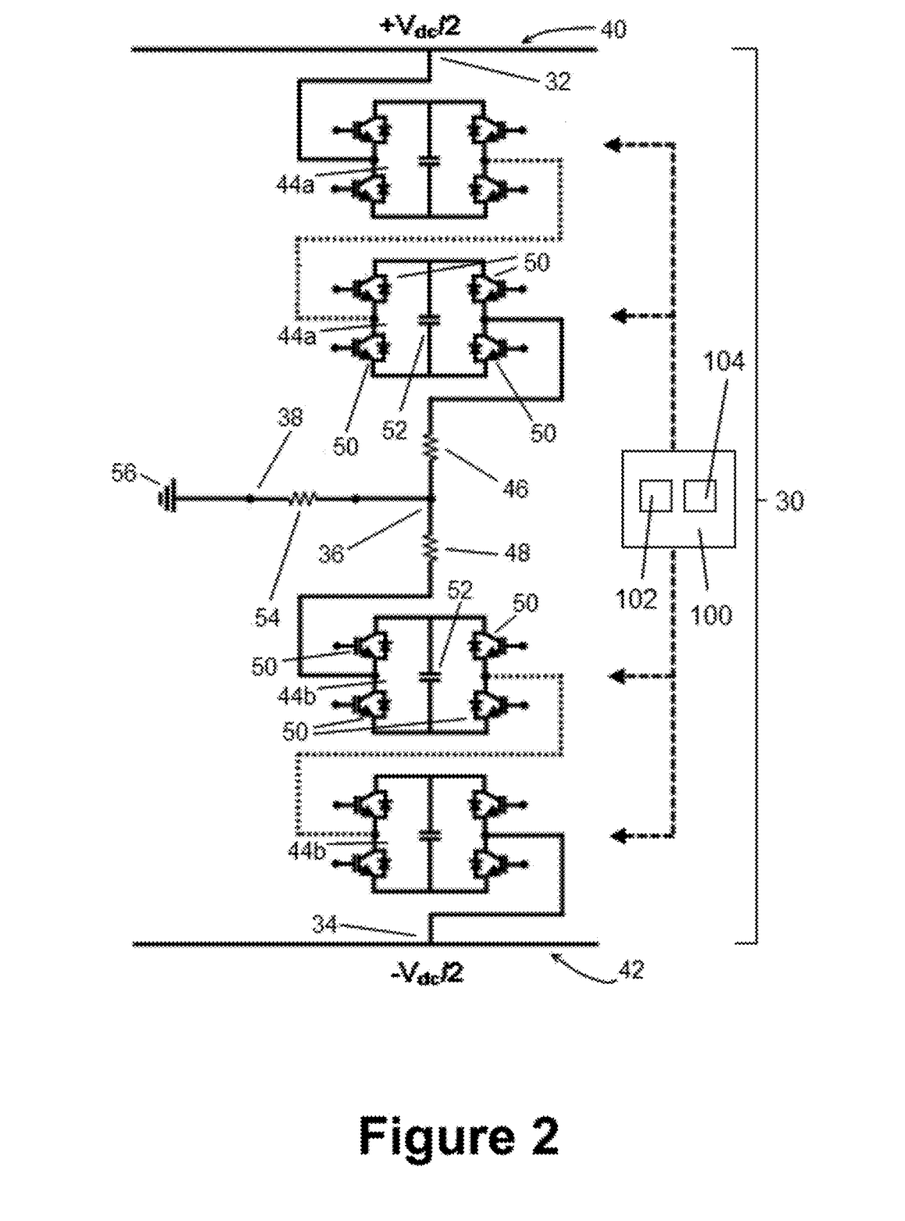
FIG. 2 shows, in schematic form, a control circuit according to a first embodiment of the invention.

A control circuit 30 according to a first embodiment of the invention is shown in FIG. 2.

The first control circuit 30 comprises first and second primary terminals 32,34, a secondary terminal 36 and an auxiliary terminal 38.

In use, the first primary terminal 32 is connected to a first DC transmission line 40 that is at a positive voltage, +VDC/2, while the second primary terminal 34 is connected to a second DC transmission line 42 that is at a negative voltage, −VDC/2.

The first control circuit 30 further includes a plurality of modules 44a,44b that are connected in series with first and second primary resistors 46,48 between the first and second primary terminals 32,34 to define a current transmission path.

Each module 44a,44b includes two pairs of switching elements 50 connected in parallel with an energy storage device in the form of a capacitor 52. The switching elements 50 and the capacitor 52 are connected in a full-bridge arrangement which defines a 4-quadrant bipolar module 44a,44b that can provide a negative, zero or positive voltage and can conduct current in two directions.

The plurality of modules 44a,44b is divided into a plurality of first modules 44a and a plurality of second modules 44b. The plurality of first modules 44a is connected in series with the first primary resistor 46 between the first primary terminal 32 and the secondary terminal 36 to define a first current transmission path portion, while the plurality of second modules 44b is connected in series with the second primary resistor 48 between the second primary terminal 34 and the secondary terminal 36 to define a second current transmission path portion.

The secondary terminal 36 is connected in series between the first and second primary terminals 32,34 to define a mid-point of the current transmission path that separates the first and second current transmission path portions.

In other embodiments of the invention, it is envisaged that each primary resistor 46,48 may be replaced by a plurality of primary resistors. It is further envisaged that, in such embodiments, the modules and primary resistors in each of the first and second current transmission portion may be re-arranged to define different series-connected arrangements. For example, the modules and primary resistors of each current transmission path portion may be arranged to define an alternating sequence of series-connected modules and primary resistors.

The first control circuit 30 further includes an auxiliary resistor 54 connected in series between the secondary and auxiliary terminals 36,38.

The auxiliary resistor 54 is preferably sized to have the same resistance value as each of the first and second primary resistors 46,48, but may be sized to have a higher resistance than each of the first and second primary resistors 46,48.

In other embodiments of the invention, it is envisaged that the auxiliary resistor 54 may be replaced by a plurality of auxiliary resistors.

In use, the auxiliary terminal 38 is connected to ground 56.

It is envisaged that, in other embodiments of the invention, each of the primary and auxiliary resistors 46,48,54 may be replaced by another type of energy conversion element that is capable of dissipating electrical energy.

The capacitor 52 of each module 44a,44b may be selectively removed from the current transmission path, i.e. switched in or out of circuit with the corresponding primary resistor 46,48, by changing the state of the switching elements 50. This allows the current in the first control circuit 30 to selectively flow through or bypass each capacitor 52.

The capacitor 52 of each module 44a,44b is removed from the current transmission path, i.e. switched out of circuit with the corresponding primary resistor 46,48, when the pairs of switching elements 50 are configured to form a short circuit in the module 44a,44b. This causes the current in the first control circuit 30 to pass through the short circuit and bypass the capacitor 52. Such a configuration allows the module 44a,44b to provide a zero voltage.

The capacitor 52 of each module 44a,44b is returned to the current transmission path, i.e. switched back into circuit with the corresponding primary resistor 46,48, when the pairs of switching elements 50 are configured to allow the current in the first control circuit 30 to flow into and out of the capacitor 52. The capacitor 52 is then able to charge or discharge its stored energy and provide a voltage. The bidirectional nature of the 4-quadrant bipolar module 44a, 44b means that the capacitor 52 may be inserted into the 4-quadrant bipolar module 44a,44b in either forward or reverse directions so as to provide a positive or negative voltage.

Each module 44a,44b may be configured to selectively block current from flowing therethrough by changing the state of the switching elements 50 to stop conducting current. When current is blocked from flowing through a module 44a,44b, its capacitor 52 is prevented from charging or discharging its stored energy and thereby remains at a constant voltage level.

It is envisaged that the two pairs of switching elements 50 of each module 44a,44b may be replaced by other configurations that are capable of selectively removing a corresponding energy storage device, e.g. a capacitor, from the current transmission path and blocking current from flowing through the module 44a,44b in the aforementioned manner.

Each switching element 50 includes an insulated gate bipolar transistor (IGBT) connected in parallel with an anti-parallel diode. In other embodiments of the invention, each switching element 50 may include a gate turn-off thyristor, a field effect transistor, an injection enhanced gate transistor or an integrated gate commutated thyristor, or other force-commutated or self-commutated semiconductor switches.

In still further embodiments of the invention, each capacitor 52 may be replaced by another energy storage device such as a battery, or a fuel cell, or any device that is capable of storing and releasing electrical energy to provide a voltage.

The plurality of first modules 44a and the plurality of second modules 44b each define a chain-link converter. It is possible to build up a combined voltage across each chain-link converter, which is higher than the voltage available from each of its individual modules 44a,44b, via the insertion of the capacitors 52 of multiple modules 44a,44b, each providing its own voltage, into each chain-link converter.

In this manner switching of the switching elements 50 of each 4-quadrant bipolar module 44a,44b causes each chain-link converter to provide a stepped variable voltage source, which permits the generation of a voltage waveform across each chain-link converter using a step-wise approximation.

The first control circuit 30 further includes a control unit 100 having first and second controllers 102,104. The first controller 102 switches the switching elements 50 in each module 44a,44b to selectively remove its capacitor 52 from or insert its capacitor 52 into the current transmission path. The second controller 104 selectively switches the switching element 50 in each module 44a,44b to selectively block current from flowing through each module 44a,44b.

The operation of the first control circuit 30 shown in FIG. 2 within a DC power transmission scheme is described below with reference to FIGS. 2 to 7.

The first and second DC transmission lines 40,42 interconnect first and second power converters (not shown) that are themselves connected to respective phases of corresponding first and second AC networks (not shown). Power is transmitted from the first AC network to the second AC network via the corresponding power converters and the first and second DC transmission lines 40,42.

During normal operation of the DC transmission scheme, the first control circuit 30 adopts a standby configuration in which the capacitor 52 of each module 44a,44b is inserted into the current transmission path, i.e. switched into circuit with the corresponding primary resistor 46,48.

The total voltage across the modules 44a,44b is approximately equal to VDC, which is the DC transmission scheme voltage across the DC transmission lines 40,42. In this configuration there is zero or minimal current flowing through the current transmission path, i.e. through the modules 44a,44b and the primary resistors 46,48.

In the event that the second power converter is unable to receive the transmitted power as a result of, for example, a fault in the second AC network, the first AC network must temporarily continue transmitting power into the DC transmission lines 40,42 until the power transfer can be reduced to zero, which is typically 1-2 seconds for a wind generation plant.

In order to allow the first AC network to continue transmitting power into the DC transmission lines 40,42 via the first power converter, the control unit 100 selectively removes one or more capacitors 52 of the first and/or second modules 44a,44b from the current transmission path. This results in the generation of a voltage waveform across the current transmission path, which adds or subtracts finite voltage steps to the voltage Vdc across the DC transmission lines 40,42. This in turn imposes a voltage waveform across the primary resistors 46,48 and thereby causes a current waveform to flow from the DC transmission lines 40,42 through the current transmission path and the primary resistors 46,48. As such, energy may be transferred from the DC transmission lines 40,42 and dissipated via the primary resistors 46,48.

The current waveform may be modulated to form different shapes by including one or more current components having different current characteristics so as to vary characteristics of energy removed from the DC transmission lines 40,42.

During modulation of the current waveform, the control unit 100 may selectively insert each capacitor 52 in either forward or reverse directions to offset any increase in energy level with a corresponding decrease in energy level, and vice versa, over a single duty cycle of the first control circuit 30. This allows the first control circuit 30 to maintain a zero net change in energy level of each chain-link converter and thereby maintain the average energy level of each chain-link converter at a constant value, whilst the first control circuit 30 is controlled to remove excess energy from the DC transmission lines 40,42.

Following the removal of excess energy from the DC transmission lines 40,42 through power dissipation via the primary resistors 46,48, the first controller 102 switches the switching elements 50 of the modules 44a,44b to switch each capacitor 52 back into circuit with the corresponding primary resistor 46,48. Such a configuration turns off the current flowing in the first control circuit 30, which allows the DC transmission scheme to revert to normal operation.

During normal operation of the first control circuit 30, the maximum voltage across each of the first and second current transmission path portions is equal to half of the DC transmission scheme voltage Vdc, i.e. 0.5 Vdc, while the maximum current flowing through each of the first and second current transmission path portions is equal to half of the DC transmission scheme voltage Vdc divided by the resistance of the corresponding primary resistor 46,48 when all of the capacitors 52 are removed from the respective current transmission path portion. Each module 44a,44b and primary resistor 46,48 is therefore rated to be compatible with these maximum voltage and current levels arising during normal operation of the first control circuit 30.

A fault or other abnormal operating condition in the DC transmission scheme may lead to a DC pole-to-ground fault 58 occurring between one of the DC transmission lines 40,42 and ground 56, i.e. a short circuit between one of the DC transmission lines 40,42 and ground 56 that bypasses the corresponding current transmission path portion.

Figure 3:
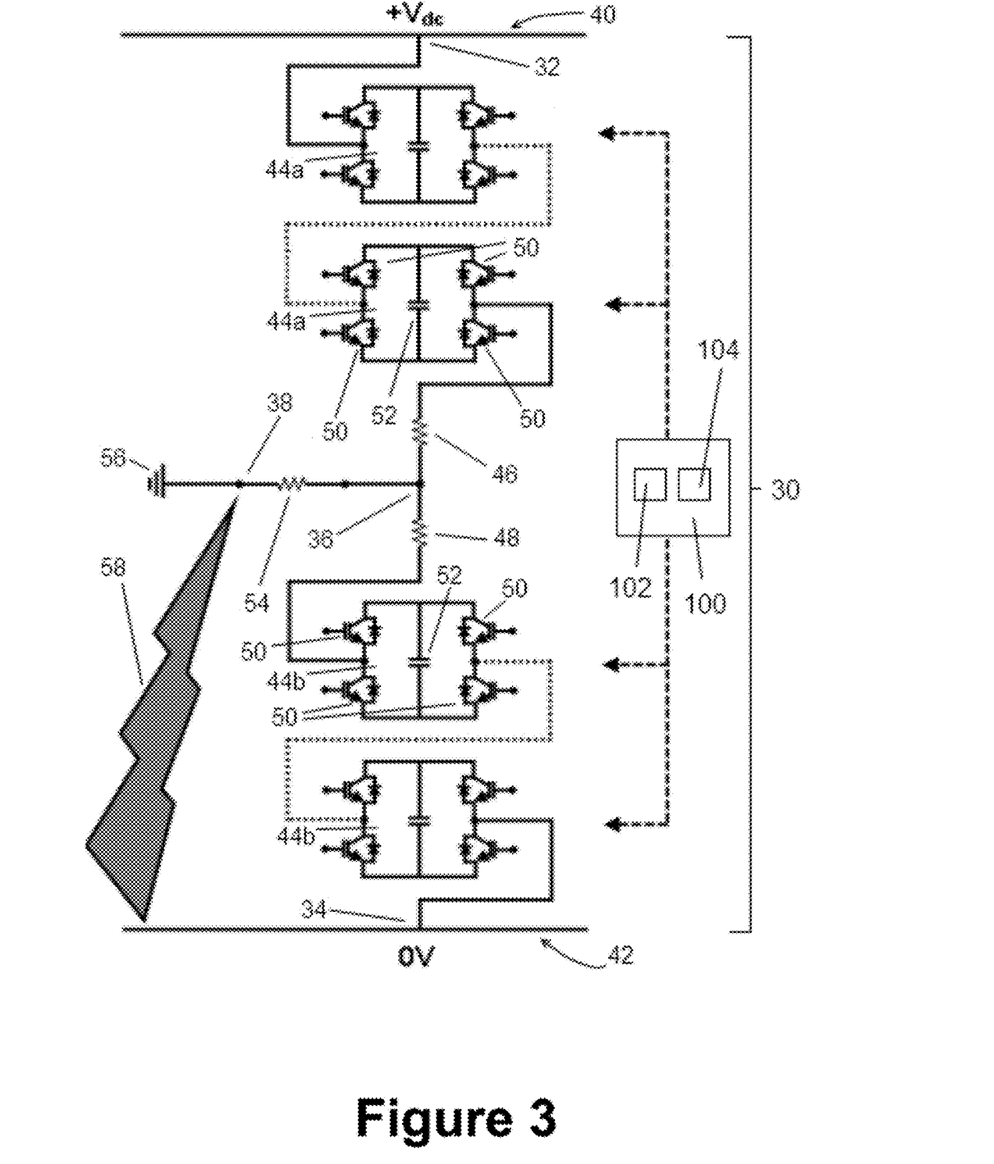
FIG. 3 illustrates a DC pole-to-ground fault between the second DC transmission line and ground.

For the purposes of this specification, the following fault operation of the first control circuit 30 during the DC pole-to-ground fault 58 is described with reference to a short circuit between the second DC transmission line 42 and ground 56 that bypasses the second current transmission path portion, as shown in FIG. 3.

In the event of the DC pole-to-ground fault 58, the resulting short-circuit between the second DC transmission line 42 and ground 56 causes the voltage difference between the second DC transmission line 42 and ground 56 to collapse to zero voltage.

Figure 4:
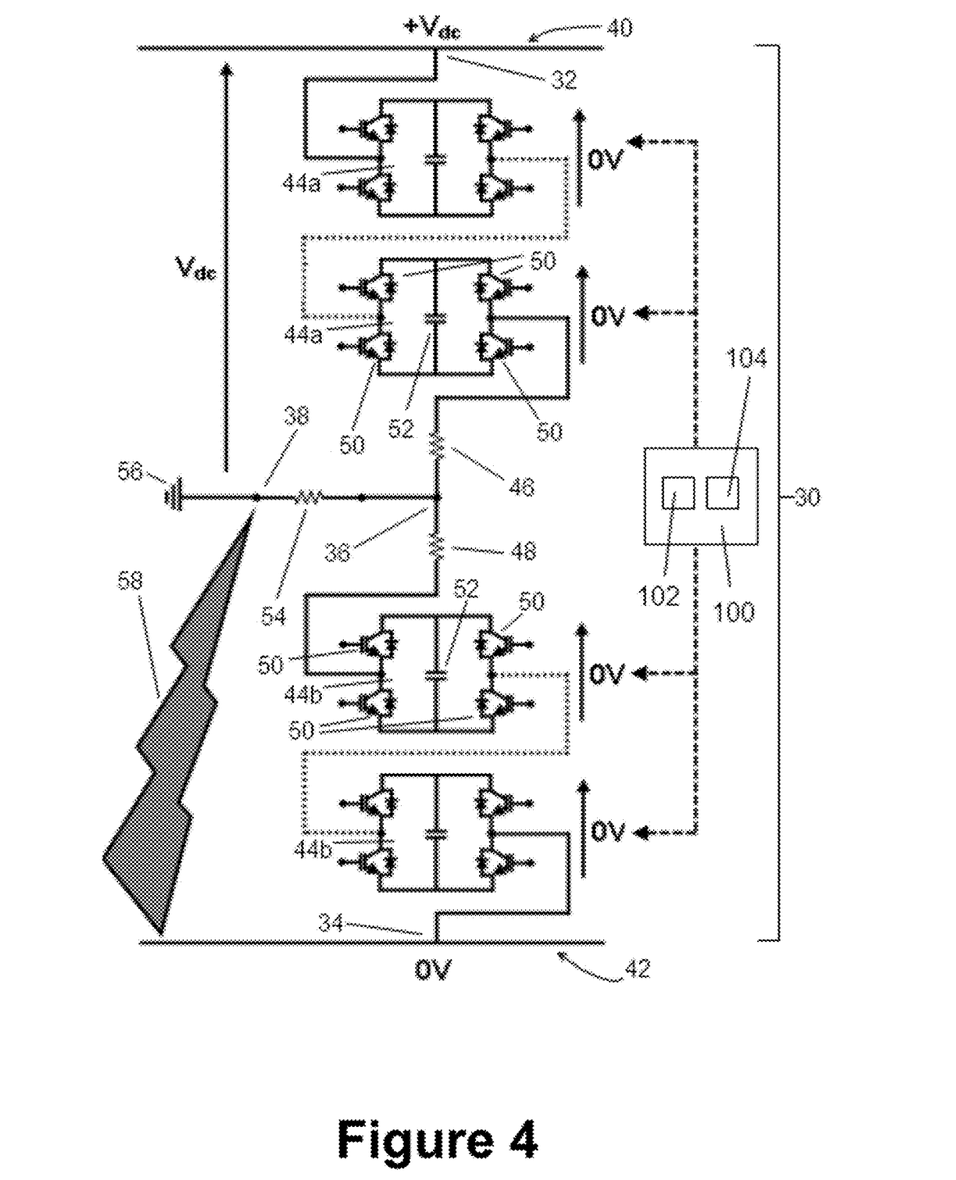
FIG. 4 illustrates the removal of the capacitors of the first and second modules from the current transmission path during the DC pole-to-ground fault.

As soon as the DC pole-to-ground fault 58 is detected, the control unit 100 enters a fault protection mode, as shown in FIG. 4.

In the fault protection mode, the control unit 100 selectively removes the capacitors 52 of the first and second modules 44a,44b from the current transmission path. The removed capacitors 52 therefore cannot conduct current and therefore cannot be charged or discharged. Thus, the voltage level of each capacitor 52 remains the same whilst it is removed from the current transmission path, and is thereby protected from damage due to overvoltage.

Removal of the capacitors 52 of the first modules 44a from the current transmission path results in the DC transmission scheme voltage Vdc being imposed across the first primary resistor 46 and the auxiliary resistor 54. Since the auxiliary resistor 54 has the same resistance as the first primary resistor 46, the voltage drop across the first primary resistor 46 is equal to 0.5 Vdc. The maximum current flowing through the first primary resistor 46 during the DC pole-to-ground fault 58 is therefore equal to 0.5 Vdc divided by the resistance of the first primary resistor 46, which is equal to the maximum current level flowing through the first primary resistor 46 during normal operation of the first control circuit 30. Thus, the first modules 44a and the first primary resistor 46 are protected from damage due to overcurrent.

Optionally, in the fault protection mode, the control unit 100 may selectively switch the second modules 44b to block current from flowing therethrough, instead of selectively removing the capacitors 52 of the second modules 44b from the current transmission path.

Meanwhile the first DC transmission line 40 is overcharged to Vdc as a result of its exposure to the DC transmission scheme voltage Vdc during the DC pole-to-ground fault 58.

The first control circuit 30 is therefore operable in the fault protection mode to protect the components of the first control circuit 30 from overvoltage and overcurrent situations during the DC pole-to-ground fault 58, until the DC pole-to-ground fault 58 has been cleared.

Figure 5:
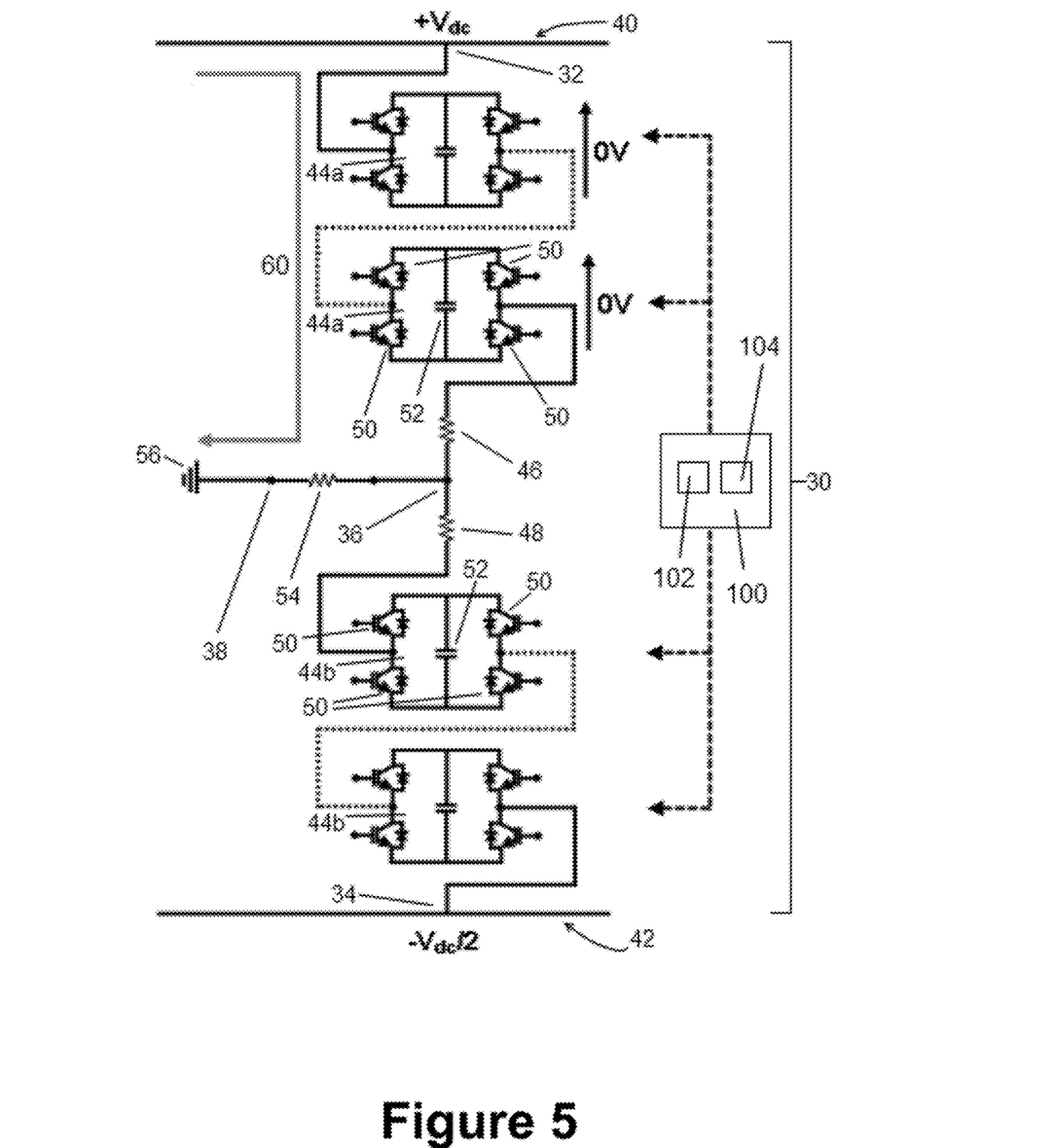
FIG. 5 illustrates the discharging of the first DC transmission line after the DC pole-to-ground fault has been cleared.

After the DC pole-to-ground fault 58 has been cleared, the first control circuit 30 enters a network discharging mode, as shown in FIG. 5.

In the network discharging mode, the control unit 100 selectively removes the capacitors 52 of the first modules 44a from the current transmission path. This causes a current waveform 60 to flow from the first DC transmission line 40 to ground 56 via the first current transmission path portion. This enables excess energy to be drawn from the overcharged, first DC transmission line 40 and dissipated via the first primary resistor 46 and the auxiliary resistor 54.

At the same time, the control unit 100 selectively switches the second modules 44b to block current from flowing therethrough, so as to prevent energy from being drawn from the second DC transmission line 42 during the network discharging mode.

Optionally, the control unit 100 may selectively insert one or more capacitors 52 of the first modules 44a into the current transmission path to produce a negative voltage to speed up the discharging process, or to produce a varying voltage to control the rate of discharge of the first DC transmission line 40.

Once the first DC transmission line 40 is discharged back to its normal operating voltage of +Vdc/2, the first control circuit 30 exits the network discharging mode and selectively inserts all the capacitors 52 of the first and second modules 44a,44b into the current transmission path. This returns the first control circuit 30 to its standby configuration, and enables the DC transmission scheme and the first control circuit 30 to resume normal operation.

It will be appreciated that the above-described fault operation of the first control circuit 30 during the DC pole-to-ground fault 58 is equally applicable to a short circuit occurring between the first DC transmission line 40 and ground 56 that bypasses the first current transmission path portion.

The inclusion of the auxiliary resistor 54 in the first control circuit 30 therefore permits control over the maximum voltage and current levels seen by the components of the first control circuit 30 so as to be the same during normal and fault operation of the first control circuit 30. This therefore obviates the need to increase the voltage and current ratings of the components of the first control circuit 30, and thereby minimises the overall size and cost of the first control circuit 30.

In addition, the modules 44, first and second primary resistors 46,48 and control unit 100 are used in both normal and fault operations of the first control circuit 30. This thereby removes the need for additional equipment to protect the components of the first control circuit 30 from overvoltage and overcurrent situations, and thereby minimises the size and complexity of the first control circuit 30.

The first control circuit 30 is therefore not only capable of regulating energy levels in the DC transmission lines 40,42, but is also capable of protecting its components in a cost-efficient manner.

It is envisaged that, in embodiments of the invention, the control unit 100 may selectively remove one or more capacitors 52 from the current transmission path during normal operation of the control circuit to charge one or more other capacitors 52, which are inserted into the current transmission path, through absorption of energy from the DC transmission lines 40,42 to offset any operating losses of each module 44a,44b and thereby maintain the average energy level of each module 44a,44b at a constant value.

A fault or other abnormal operating condition in the DC transmission scheme may also lead to a DC pole-to-pole fault 62 occurring between the DC transmission lines 40,42, i.e. a short circuit between the DC transmission lines 40,42 that bypasses the first control circuit 30.

Figure 6:
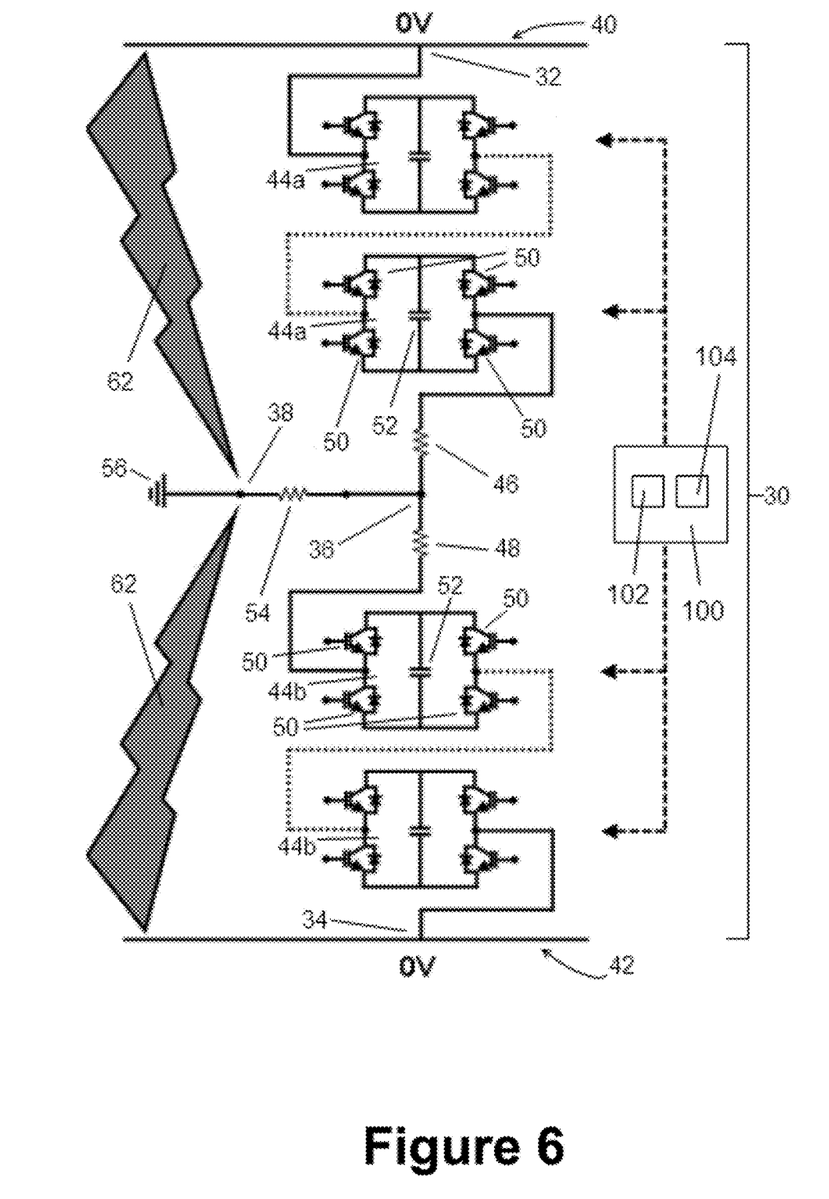
FIG. 6 illustrates a DC pole-to-pole fault between the DC transmission lines.

In the event of the DC pole-to-pole fault 62, the resulting short-circuit between the DC transmission lines 40,42 causes the voltage difference between the DC transmission lines 40,42 to collapse to zero voltage, as shown in FIG. 6.

Figure 7:
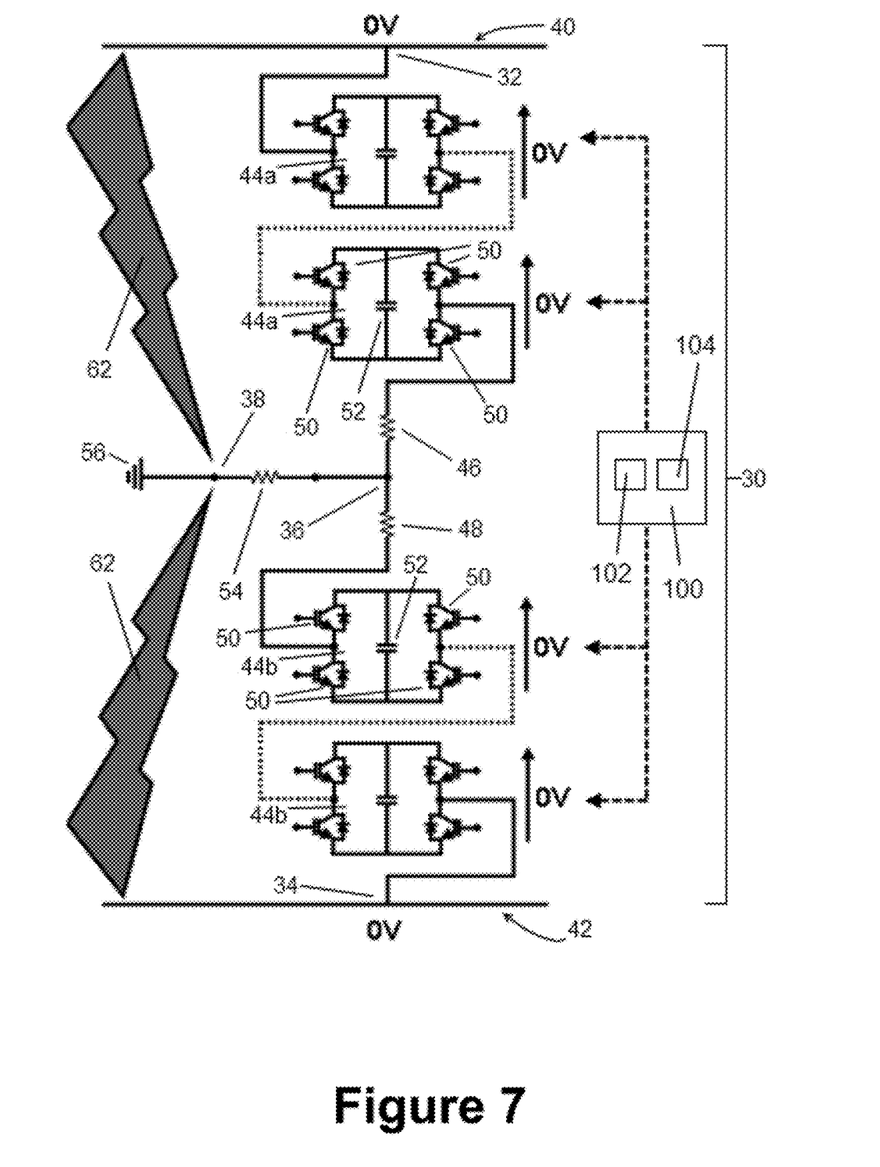
FIG. 7 illustrates the removal of the capacitors of the first and second modules from the current transmission path during the DC pole-to-pole fault.

As soon as the DC pole-to-pole fault 62 is detected, the control unit 100 selectively removes the capacitors 52 of the first and second modules 44a,44b from the current transmission path, as shown in FIG. 7. The removed capacitors 52 cannot conduct current and therefore cannot be charged or discharged. Thus, the voltage level of each capacitor 52 remains the same whilst it is removed from the current transmission path, and is thereby protected from damage due to overvoltage.

Optionally, as soon as the DC pole-to-pole fault 62 is detected, the control unit 100 may selectively switch the first and second modules 44a,44b to block current from flowing therethrough, instead of selectively removing the capacitors 52 of the first and second modules 44a,44b from the current transmission path. Thus, current is prevented from flowing through each module 44a,44b through turn-off of the IGBTs and reverse-biasing of the anti-parallel diodes resulting from the sum of the voltages of the capacitors 52 exceeding the zero voltage across the DC transmission lines 40,42.

After the DC pole-to-pole fault 62 has been cleared, a rectifier station (not shown) is used to charge the DC transmission cables back to their normal operating voltages. Once the DC transmission lines 40,42 are charged back to their respective normal operating voltages, the first control circuit 30 selectively inserts all the capacitors 52 of the modules 44a,44b into the current transmission path. This returns the first control circuit 30 to its standby configuration, and enables the DC transmission scheme and first control circuit 30 to resume normal operation.

Figure 8:
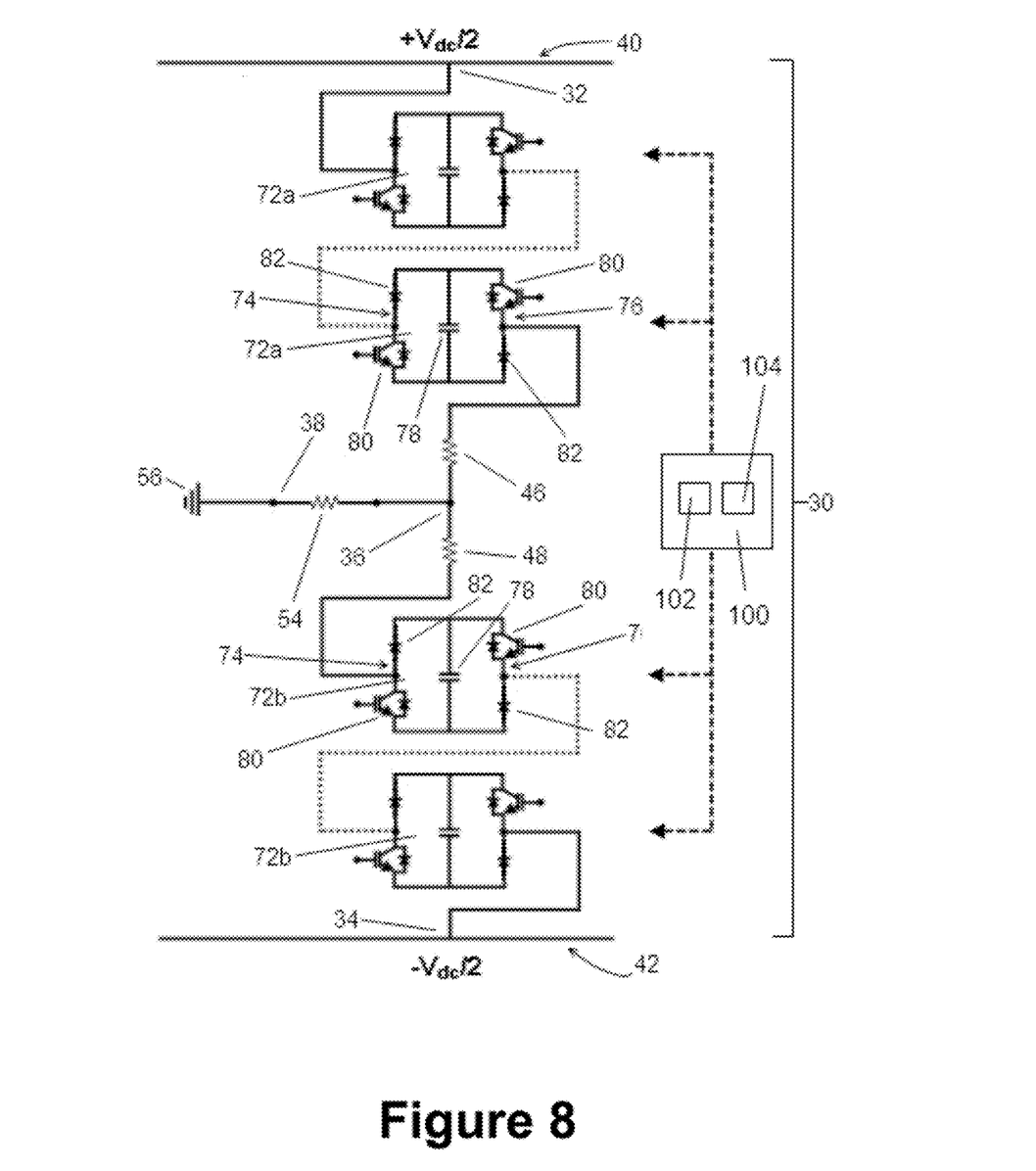
FIG. 8 shows, in schematic form, a control circuit according to a second embodiment of the invention.

A control circuit 70 according to a second embodiment of the invention is shown in FIG. 8. The second control circuit 70 is similar in structure and operation to the first control circuit 30 shown in FIG. 2 and like features share the same reference numerals.

The second control circuit 70 differs from the first control circuit 30 in that each module 72a,72b of the second control circuit 70 includes first and second sets of series-connected current flow control elements 74,76 that are connected in parallel with a capacitor 78 in a full-bridge arrangement to define a 2-quadrant rationalised bipolar module 72a,72b that can provide zero, positive or negative voltage while conducting current in a single direction.

Each set of the series-connected current flow control elements 74,76 includes a switching element 80, which in the embodiment shown is an IGBT connected in parallel with an anti-parallel diode, to selectively direct current through the capacitor 78, and a secondary passive current check element 82, which is in the form of a diode to limit current flow through the module 72a,72b to a single direction.

The configuration of each module 72a,72b in the second control circuit 70 reduces the overall number of components, and therefore reduces the size and cost of the second control circuit 70 in comparison to the first control circuit 30.

The invention claimed is:

1. A control circuit comprising first and second primary terminals for connection to a DC network, the first primary terminal and the second primary terminal each having a plurality of modules and a plurality of primary energy conversion elements connected in series therebetween to define a current transmission path, each module including at least one energy storage device, each energy storage device being selectively removable from the current transmission path;

the control circuit further including a secondary terminal connected in series between the first primary terminal and the second primary terminal, the plurality of modules including at least one first module and at least one second module, the or each first module being connected in series with at least one primary energy conversion element between the first primary terminal and the secondary terminal to define a first current transmission path portion, the or each second module being connected in series with at least one other primary energy conversion element between the second primary terminal and the secondary terminal to define a second current transmission path portion;

the control circuit further including an auxiliary resistor and an auxiliary terminal, the auxiliary resistor being connected in series between the secondary and auxiliary terminals, the auxiliary resistor having at least as much resistance as the at least one primary energy conversion element between the first primary terminal and the secondary terminal, the auxiliary resistor having at least as much resistance as the at least one other primary energy conversion element between the second primary terminal and the secondary terminal, the auxiliary terminal being for connection to ground.

2. A control circuit according to claim 1 wherein each module further includes at least one switching element to selectively direct current through the or each energy storage device and cause current to bypass the or each energy storage device.

3. A control circuit according to claim 2 wherein each module includes two pairs of switching elements connected in parallel with the or each energy storage device in a full-bridge arrangement to define a 4-quadrant bipolar module that can provide zero, positive or negative voltage and can conduct current in two directions.

4. A control circuit according to claim 2 wherein each module includes first and second sets of series-connected current flow control elements, each set of current flow control elements including a switching element to selectively direct current through the or each energy storage device and a passive current check element to limit current flow through the module to a single direction, the first and second sets of series-connected current flow control elements and the or each energy storage device being arranged in a full-bridge arrangement to define a 2-quadrant bipolar module that can provide zero, positive or negative voltage while conducting current in a single direction.

5. A control circuit according to claim 1 further including a first controller to selectively remove each energy storage device from the current transmission path, the first controller being configured to switch each energy storage device in a fault protection mode and in a network discharging mode.

6. A control circuit according to claim 5 wherein the first controller when operating in the fault protection mode selectively removes the or each energy storage device of one of the first and second current transmission path portions from the current transmission path during a fault, in use, between the auxiliary terminal and the primary terminal connected to the other of the first and second current transmission path portions.

7. A control circuit according to claim 5 wherein the first controller when operating in the network discharging mode selectively removes one or more energy storage devices of one of the first and second current transmission path portions from the current transmission path to cause a current waveform to flow from the DC network through the one of the first and second current transmission path portions.

8. A control circuit according to claim 7 wherein the one or more energy storage devices of the one of the first and second current transmission path portions is selectively removed from the current transmission path to vary the voltage across the one of the first and second current transmission path portions.

9. A control circuit according claim 1 wherein each module further includes at least one switching element to selectively block current from flowing through the module.

10. A control circuit according to claim 1 further including a second controller to selectively switch each module to block current from flowing through the module, the second controller being configured to switch each module in a fault protection mode and in a network discharging mode.

11. A control circuit according to claim 10 wherein the second controller when operating in the fault protection mode selectively switches the or each module of one of the first and second current transmission path portions to block current from flowing therethrough during a fault, in use, between the auxiliary terminal and the primary terminal connected to the one of the first and second current transmission path portions.

12. A control circuit according to claim 10, wherein the second controller when operating in the network discharging mode selectively switches the or each module of the other of the first and second current transmission path portions to block current from flowing therethrough.

* * * * *